US012087495B2

(12) United States Patent
Yan et al.

(10) Patent No.: US 12,087,495 B2
(45) Date of Patent: Sep. 10, 2024

(54) ULTRA-NARROW HIGH CURRENT POWER INDUCTOR FOR CIRCUIT BOARD APPLICATIONS

(71) Applicant: EATON INTELLIGENT POWER LIMITED, Dublin (IE)

(72) Inventors: Yipeng Yan, Pleasanton, CA (US); Yazhou Wang, Gaoyou (CN); Dengyan Zhou, Shanghai (CN)

(73) Assignee: Eaton Intelligent Power Limited, Dublin (IE)

( * ) Notice: Subject to any disclaimer, the term of this patent is extended or adjusted under 35 U.S.C. 154(b) by 635 days.

(21) Appl. No.: 16/665,181

(22) Filed: Oct. 28, 2019

(65) Prior Publication Data

US 2021/0125773 A1 Apr. 29, 2021

(51) Int. Cl.
*H01F 27/28* (2006.01)
*H01F 27/24* (2006.01)
*H01F 27/29* (2006.01)

(52) U.S. Cl.
CPC ............. *H01F 27/29* (2013.01); *H01F 27/24* (2013.01)

(58) Field of Classification Search
CPC ...... H01F 27/29; H01F 27/24; H01F 27/2847; H01F 27/292; H01F 17/043; H01F 17/04; H01F 27/263; H01F 27/306
See application file for complete search history.

(56) References Cited

U.S. PATENT DOCUMENTS

| | | | | |
|---|---|---|---|---|
| 8,310,332 | B2 | 11/2012 | Yan et al. | |
| 9,202,617 | B2 | 12/2015 | Zhou et al. | |
| 9,842,682 | B2 | 12/2017 | Yan et al. | |
| 10,049,809 | B2 | 8/2018 | Kitamura | |
| 10,431,373 | B2 * | 10/2019 | Narayanan | H01F 3/14 |
| 11,328,855 | B2 * | 5/2022 | Ashizawa | H01F 27/2847 |
| 2014/0266552 | A1 * | 9/2014 | Silva | H01F 27/306 29/606 |
| 2017/0154724 | A1 * | 6/2017 | Zhang | H01F 27/306 |
| 2018/0102210 | A1 * | 4/2018 | Knoll | H01F 27/2852 |
| 2018/0301276 | A1 * | 10/2018 | Yeh | H01F 27/292 |
| 2019/0214181 | A1 * | 7/2019 | Wang | H01F 3/14 |
| 2021/0125775 | A1 * | 4/2021 | Yan | H01F 27/263 |

OTHER PUBLICATIONS

TW Search Report for Taiwanese Application 11221210740, 2 pages, Nov. 30, 2023.

* cited by examiner

*Primary Examiner* — Mang Tin Bik Lian
(74) *Attorney, Agent, or Firm* — Baker Botts L.L.P.

(57) ABSTRACT

An electromagnetic component such as a power inductor includes first and second magnetic core pieces and a pre-formed conductive coil winding. The coil winding includes a U-shaped winding section including a top winding section and a pair of winding legs extending from opposing ends of the top winding section. The winding legs extend coplanar to one another and are oriented perpendicular to a circuit board in use. The legs are located between the first and second magnetic core pieces, and the top winding section is bent to extend perpendicularly to the plane of the pair of winding legs.

17 Claims, 19 Drawing Sheets

STATE OF THE ART

STATE OF THE ART

ULTRA-NARROW HIGH CURRENT POWER INDUCTOR FOR CIRCUIT BOARD APPLICATIONS

BACKGROUND OF THE INVENTION

The field of the invention relates generally to electromagnetic inductor components, and more particularly to an ultra-narrow, surface mount power inductor component for high power, high current circuit board applications.

Power inductors are used in power supply management applications and power management circuitry on circuit boards for powering a host of electronic devices, including but not necessarily limited to hand held electronic devices. Power inductors are designed to induce magnetic fields via current flowing through one or more conductive windings, and store energy via the generation of magnetic fields in magnetic cores associated with the windings. Power inductors also return the stored energy to the associated electrical circuit by inducing current flow through the windings. Power inductors may, for example, provide regulated power from rapidly switching power supplies in an electronic device. Power inductors may also be utilized in electronic power converter circuitry.

Existing power inductors are problematic in some aspects and improvements are desired. Specifically, trends to produce increasingly powerful, yet smaller electronic devices have led to numerous challenges to the electronics industry concerning circuit board components such as power inductors that must likewise handle the same or increased amount of power in a smaller package size. Increasingly miniaturized circuit board components are therefore desired to reduce the area occupied on a circuit board by the component (sometimes referred to as the component "footprint") and/or the component height measured in a direction perpendicular to the plane of the circuit board (sometimes referred to as the component "profile"). By decreasing the footprint and/or profile, the size of the circuit board assemblies for electronic devices can be reduced and/or the component density on the circuit board(s) can be increased. While much success has been realized in recent years regarding miniaturization of circuit board components, challenges remain and in aspects market needs have not completely been met with current component designs and manufactures.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Figure 1:
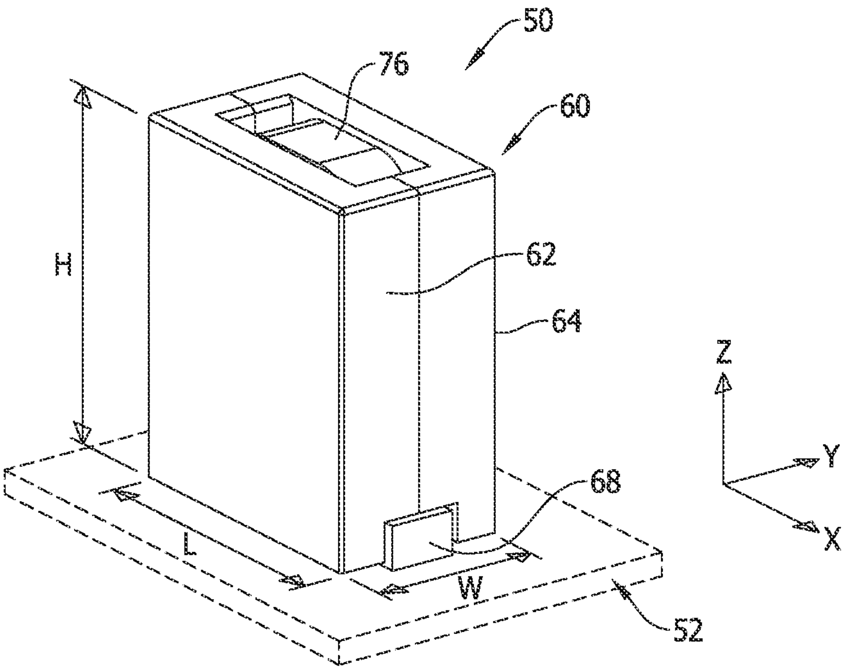
FIG. 1 is a perspective view of a state of the art high current power inductor including surface mount terminations for a circuit board application.
Figure 2:
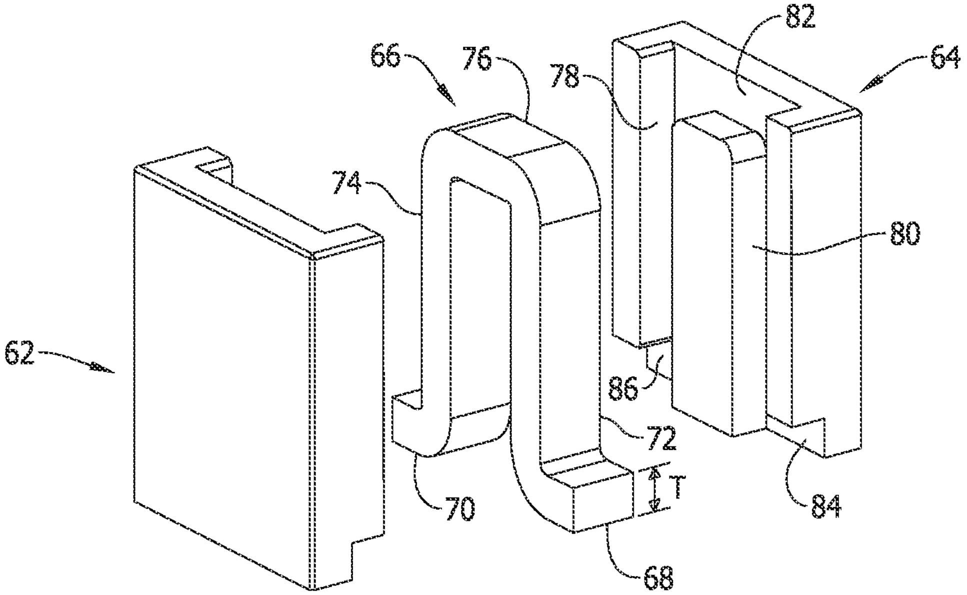
FIG. 2 is an exploded view of the power inductor shown in FIG. 1.

FIGS. 1 and 2 illustrate a perspective view and an exploded view of a state of the art high current electromagnetic component 50 that is surface mounted to a circuit board 52 using, for example, a known soldering technique. The circuit board 52 and electromagnetic component 50 define a portion of electronic circuitry included in an electronic device.

The electromagnetic component 50 generally includes a magnetic core 60 defined by a first magnetic core piece 62 and a second magnetic core piece 64. A conductive coil winding 66 is contained in respective portions of each of the first and second magnetic core pieces 62, 64. In combination, the magnetic core pieces 62, 64 impart an overall length L of the magnetic core 60 along a first dimension such as an x axis of a Cartesian coordinate system. Each magnetic core piece 62, 64 also has a width W measured along a second dimension perpendicular to the first axis such as a y axis of a Cartesian coordinate system, and a height H measured along a third dimension perpendicular to the first and second axis such as a z axis of a Cartesian coordinate system.

As seen in FIG. 1, the component dimensions L and H are much greater than the dimension W, such that when the component 50 is mounted to the circuit board 52 in the x, y plane the component 50 has a relatively large height dimension H along the z axis, while the relatively small width dimension still allows for a reduction of the footprint of the component 50 when mounted to the circuit board 52. The increased height dimension facilitates a relatively long coil winding 66 while nonetheless requiring a relatively small footprint, allowing the component 50 to capably handle higher current, higher power applications beyond the limits of other electromagnetic component constructions wherein the height dimension is reduced in the component design to lower the profile of the component when mounted to the circuit board.

The coil winding 66 is a preformed conductive element fabricated from a planar strip of conductor material that is bent into the shape as shown including surface mount terminals 68, 70 extending coplanar to one another on the bottom of the component 50 that abuts the circuit board in use, winding legs 72 and 74 extending perpendicular from each of the surface mount terminals 68, 70, and a top winding section 76 that interconnects the ends of the winding legs 72, 74. The winding legs 72, 74 and the top winding section 76 are generally U-shaped, with the winding legs 72, 74 being bent substantially perpendicular to the plane of the top winding section 76. The surface mount terminals 68, 70 extend perpendicular to the plane of the winding legs 72, 74 and extend in opposite directions to one another along the length dimension L. The thickness dimension t of the coil winding is relatively large to more capably handle higher current in use.

Each of the magnetic core pieces 62, 64 are generally identically formed to include vertically extending slots 78, 80 an upper recess 82 and lower recesses 84 and 86. The magnetic core pieces 62, 64 are arranged as mirror images of one another about the coil winding 66 with each winding leg 72, 74 extending partly in the vertical slots 78, 80 in each magnetic core piece 62, 64. The top winding section 76 extends partly in each of the upper recesses 82 in each magnetic core piece 62, 64, and the surface mount terminals 68, 70 extend partly in each of the lower recesses 84, 86. As a result, the width dimension W of the component 50 is relatively small. Each magnetic core piece 62, 64 receives only a portion of the corresponding width W of the coil winding 66 in the width dimension and the magnetic core pieces 62, 64 may also be relatively small in the width dimension.

Advantageously, the component 50 is scalable in a modular manner to include additional magnetic core pieces and additional coil windings to easily adapt the component for multi-phase power applications or to obtain further space efficiencies by incorporating multiple coil windings on a common core structure that occupies less space on the circuit board than a plurality of discrete components 50 including a single coil winding 66 would occupy if separately provided. The reader is referred to U.S. Pat. No. 9,842,682 for further details regarding modular assemblies of inductor components having coil windings 66 and their benefits.

From the perspective of further width reduction in the component 50, the coil winding 66 has been found to be problematic from a manufacturing perspective. Specifically, to handle the same power as before, a reduced width of the coil winding 66 means that the thickness t of the winding needs to increase, but as the thickness increases the coil winding 66 becomes more difficult to bend. Particularly difficulties are realized in bending the coil winding 66 to the desired shape when the width dimension of the coil winding 66 becomes less than the thickness. Such difficulties raise the cost of manufacturing the component 50 including the coil winding 66, raise performance and reliability issues, and impose practical limits on the ability to reduce the width of the component (and reduce the footprint of the component in the width dimension on the circuit board to an optimal level that provides further space efficiency on the circuit board 52.

Exemplary embodiments of inventive electromagnetic component assemblies and constructions are described below for higher current and power applications having reduced footprints in the width dimension that are difficult, if not impossible, to achieve, using the coil windings 66 and conventional techniques. Electromagnetic components and devices such as power inductors components may also be fabricated with reduced cost compared to other known miniaturized power inductor constructions. Manufacturing methodology and steps associated with the devices described are in part apparent and in part specifically described below but are believed to be well within the purview of those in the art without further explanation.

Figure 3:
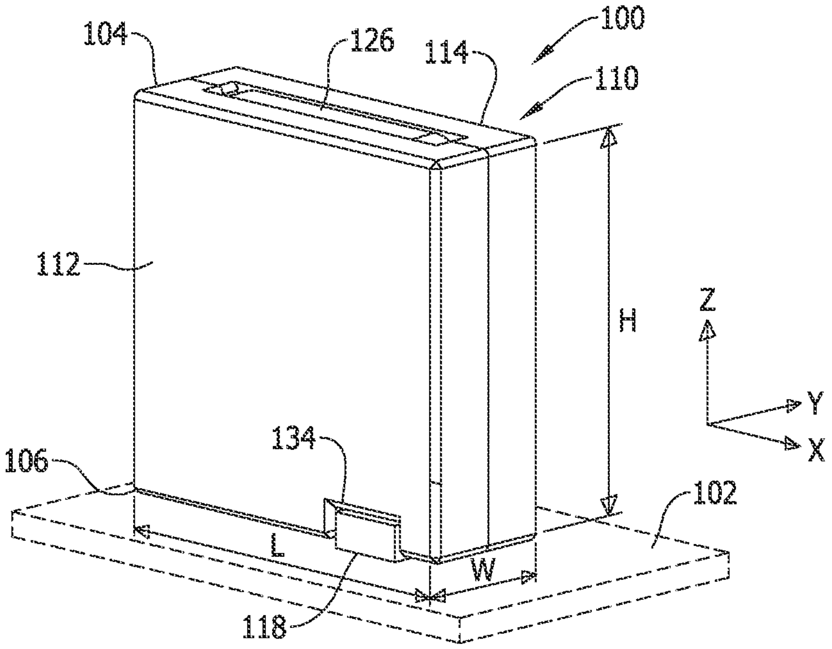
FIG. 3 is a perspective view of an improved high current power inductor including surface mount terminations for a circuit board application according to a first exemplary embodiment of the invention.
Figure 4:
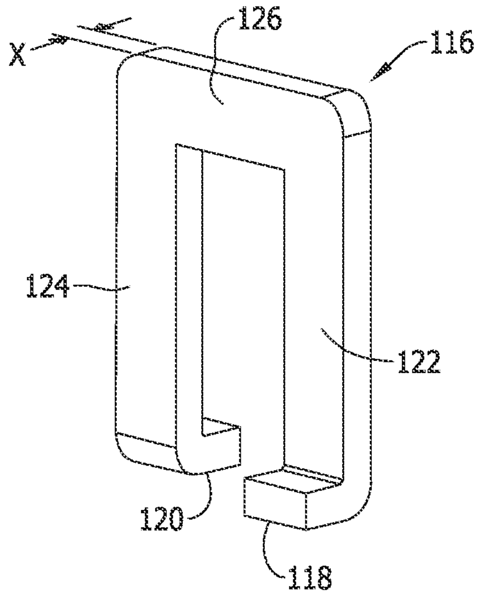
FIG. 4 is a perspective view of an inductor coil winding for the power inductor shown in FIG. 3.
Figure 5:
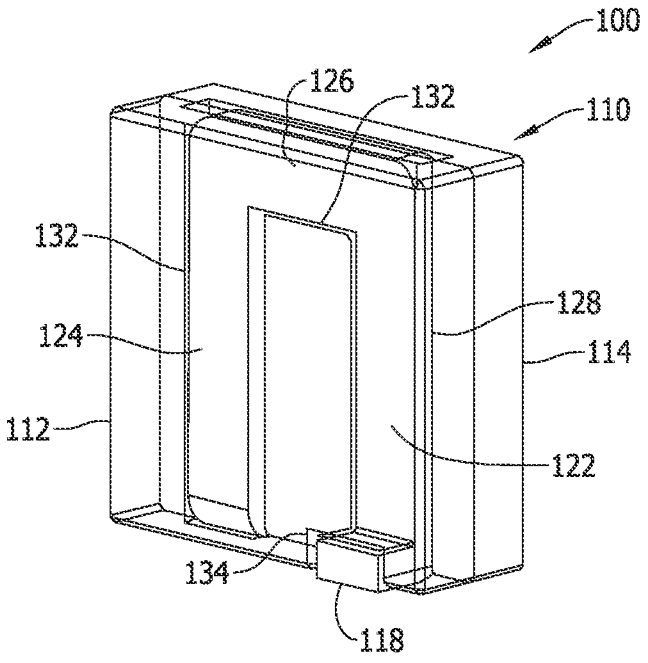
FIG. 5 is a partly transparent perspective view of the power inductor shown in FIG. 3.
Figure 6:
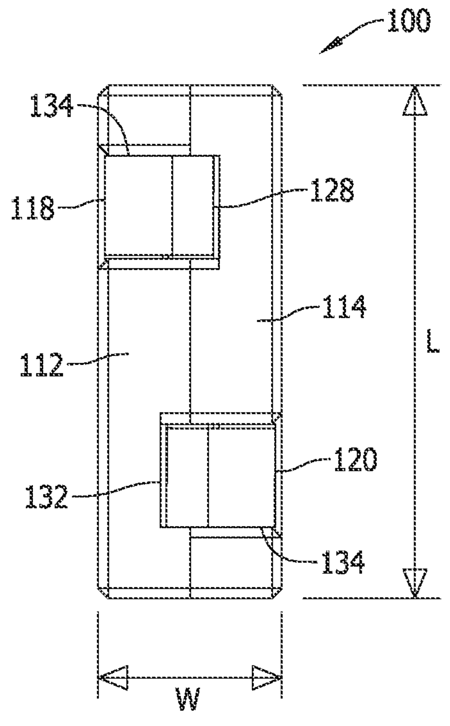
FIG. 6 is a bottom view of the power inductor shown in FIGS. 3 and 5 and illustrating the surface mount terminals of the inductor coil winding shown in FIG. 4.

FIGS. 3 through 6 illustrate various views of an improved electromagnetic component 100 according to a first exemplary embodiment of the invention, wherein FIG. 3 is a perspective view of the component 100, FIG. 4 is a perspective view of an inductor coil winding for the component 100, FIG. 5 is a partly transparent perspective view of the component 100, and FIG. 6 is a bottom view of the component 100. As described below, the component 100 is configured as a power inductor component, although other types of electromagnetic components may benefit from the teachings described below, including but not necessarily limited to inductor components other than power inductors.

The electromagnetic component 100 is surface mounted to a circuit board 102 using, for example, a known soldering technique. The circuit board 102 and electromagnetic component 100 define a portion of electronic circuitry included in an electronic device.

The electromagnetic component 100 generally includes a magnetic core 110 defined by a first magnetic core piece 112 and a second magnetic core piece 114. The core 110 and each of the first magnetic core piece 110 and the second magnetic core piece 112 generally include a top side 104 and a bottom side 106, wherein the top side 104 is elevated from the circuit board 102 and the bottom side 106 is proximate the circuit board 102 in use. The first magnetic core piece 110 and the second magnetic core piece 112 are arranged vertically relatively to the circuit board 102 in a side-by-side relationship to one another.

A conductive coil winding 116 is received in between and contained by respective portions of each of the first and second magnetic core pieces 112, 114. In combination, the magnetic core pieces 112, 114 impart an overall length L of the magnetic core 110 along a first dimension such as an x axis of a Cartesian coordinate system. Each magnetic core piece 112, 114 also has a width W measured along a second dimension perpendicular to the first axis such as a y axis of a Cartesian coordinate system, and a height H measured along a third dimension perpendicular to the first and second axis such as a z axis of a Cartesian coordinate system.

As seen in FIG. 3, the component dimensions L and H are much greater than the dimension W, such that when the component 100 is mounted to the circuit board 102 in the x, y plane the component 100 has a relatively large height dimension H along the z axis, and a reduced width dimension W still allows for a reduction of the footprint of the component 100 when mounted to the circuit board 102. The increased height dimension facilitates a relatively long coil winding 116 while nonetheless requiring a relatively small footprint, allowing the component 100 to capably handle higher current, higher power applications with a substantial reduction in width.

The coil winding 116 (FIG. 4) is a preformed conductive element fabricated from a planar sheet of conductive material that is formed and bent into the shape as shown including surface mount terminals 118, 120 extending coplanar to one another on the bottom of the component 100 that abuts the circuit board in use, winding legs 122 and 124 extending perpendicular from each of the surface mount terminals 118, 120, and a top winding section 126 that interconnects the ends of the winding legs 122, 124. The winding legs 122, 124 and the top winding section 126 are generally U-shaped, but unlike the coil winding 66 described above in the component 50, the winding legs 122, 124 and the top winding section 126 are all coplanar elements in the coil winding 116. The surface mount terminals 118, 120 extend perpendicular to the plane of the winding legs 122, 124 and the top winding section 126, with the surface mount terminals extending in opposite directions to one another along the width dimension W. More specifically, the first surface mount terminal 118 extends toward the first magnetic piece 112 and away from the second magnetic core piece 114, while the second surface mount terminal 120 extends toward the second magnetic piece 114 and away from the first magnetic core piece 112 as shown in FIG. 6. As such, the respective surface mount terminals 118, 120 generally reside on the bottom of only one of the two magnetic core pieces 112, 114 provided.

Like the coil winding 66, the coil winding 116 defines less than one complete turn of an inductor winding in the magnetic core, yet has a sufficient thickness t and cross sectional area to capably conduct higher current to meet performance requirements in higher power circuitry implemented on the circuit board 102. Compared to the coil winding 66 that is formed from a planar, elongated strip of material that is subsequently shaped with four bends into the desired U-shape with surface mount terminals as shown and described in relation to FIG. 2, the coil winding 116 only includes two bends to fabricate into the desired U-shape with surface mount terminals and is therefore simpler to fabricate.

In contemplated embodiments of fabricating the coil winding 116, a coil winding pattern including the surface mount terminals 118, 120, the winding legs 122, 124 and the top winding section 126 may be stamped or otherwise cut from a sheet of a conductive material having the desired thickness at a first stage of manufacture. At a second stage of manufacture the surface mount terminals 118, 120 may each be bent from the plane of the winding legs 122, 124 and the top winding section 126 in opposite directions. As such, the coil winding 66 requires two additional bends to shape the top winding section while the coil winding 116 does not, thereby avoiding complications and difficulties in bending the relatively small top winding section that the coil winding 66 requires.

The thickness t of the conductive material used to fabricate the winding legs 122, 124 and the top winding section 126 that define the U-shaped coil winding section is oriented to extend parallel to and resides in the width dimension instead of extending parallel to and residing in the length and height dimension of the coil winding 66 in the component 50. In other words, the thickness of the material used to fabricate the coil winding 116 is rotated 90° from the orientation of the thickness of the material used to fabricate the coil winding 66. The plane of the coplanar winding legs 122, 124 in the component 100 extends parallel to the length dimension L in the component 100, whereas in the coil winding 66 the winding legs 72, 74 extend parallel to the width dimension. Since in each case, the thickness dimension t of the conductive material used to fabricate the coil winding is considerably less than its width when the conductor is shaped to final form, substantial reduction of the width of the component 100 relative to the component 50 is therefore possible while otherwise having similar power capabilities for high current, high power circuitry established on the circuit board 102.

In contemplated embodiments, the magnetic core pieces 112, 112 may be fabricated into discrete, shaped magnetic core pieces as shown and described utilizing soft magnetic particle materials and known techniques such as molding of granular magnetic particles to produce the desired shapes. Soft magnetic powder particles used to fabricate the magnetic core pieces may include Ferrite particles, Iron (Fe) particles, Sendust (Fe—Si—Al) particles, MPP (Ni—Mo—Fe) particles, HighFlux (Ni—Fe) particles, Megaflux (Fe—Si Alloy) particles, iron-based amorphous powder particles, cobalt-based amorphous powder particles, and other suitable materials known in the art. In some cases, magnetic powder particles may be are coated with an insulating material such the magnetic core pieces may possess so-called distributed gap properties familiar to those in the art and fabricated in a known manner. The magnetic core pieces may be fabricated from the same or different magnetic materials and as such may have the same or different magnetic properties as desired. The magnetic powder particles used to fabricate the magnetic core pieces may be obtained using known methods and techniques and molded into the desired shapes also using known techniques.

In the exemplary embodiment illustrated, of the magnetic core pieces 112, 114 are generally identically formed as discrete, shaped core elements which include vertically extending slots 128, 130 one side thereof, a centrally located upper recess 132 and a single off-centered lower recess 134 on a bottom edge thereof. The magnetic core pieces 112, 114 are arranged as mirror images of one another about the coil winding 116 with each winding leg 122, 124 extending partly in the vertical slots 128, 130 in each magnetic core piece 112, 114. Because the thickness dimension t of the coil winding 116 is oriented along the length dimension of the component 100, the vertically extending slots 128, 130 can be relatively shallow in comparison to the magnetic core pieces 62, 64 in the component 50, thereby allowing for some simplification in the shape of the magnetic core pieces and therefore providing further manufacturing benefits. The magnetic core pieces 112, 114 and the coil windings 116 may be separately fabricated in batch processing, and provided as preformed and prefabricated modular elements for assembly into components 100 in a reduced amount of time and at lower cost with respect to certain conventional component constructions wherein coil windings are formed and fabricated upon substrate materials in thin layers in a sequenced manner.

When assembled, the top winding section 126 extends partly in each of the upper recesses 132 in each magnetic core piece 112, 114 at a distance elevated from the circuit board 102 and generally parallel to the plane of the circuit board 102, the winding legs 122 and 124 extend vertically from the horizontal plane of the circuit board (i.e., perpendicular to the plane of the circuit board 102 and to the top winding section 126) for a desired distance in the height dimension H, and the surface mount terminals 118, 120 extend respectively in the lower recess 134 of one of the magnetic core pieces 112, 114. The top winding section 126 is exposed on the upper or top side of the magnetic core pieces 112, 114 that is elevated from the circuit board 102, while the surface mount terminals 118, 120 are exposed on the lower or bottom side of the magnetic core pieces 112, 114 for surface mounting to the circuit board 102 using known techniques. The width dimension W of the assembled component 100 is about equal to the overall distance between the distal ends of the surface mount terminals 118, 120 in the width dimension. The combination of the thickness t of the coil winding 116 residing in the width dimension and the oppositely directed surface mount terminals 118, 120 in the width dimension allows the width dimension W of the assembled component 100 to be substantially minimized. The component 100 is accordingly sometimes referred to as an ultra-narrow component relative to the component 50 and other electromagnetic components having similar performance capabilities but a greater width dimension.

The component 100 is scalable in a modular manner as further described below to include additional magnetic core pieces and additional coil windings and easily adapt the component for multi-phase power applications or to obtain further space efficiencies by incorporating multiple coil windings on a common core structure that occupies less space on the circuit board than a plurality of discrete components 50 including a single coil winding 66.

Figure 7:
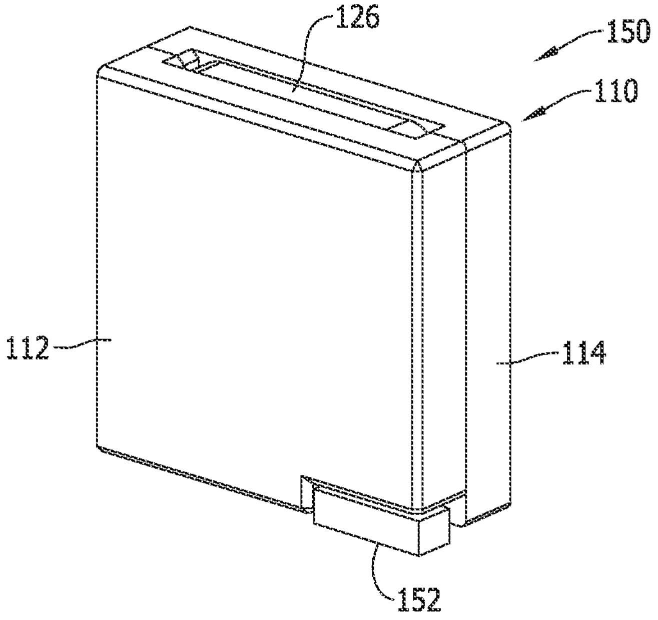
FIG. 7 is a perspective view of an improved high current power inductor including surface mount terminations for a circuit board application according to a second exemplary embodiment of the invention.
Figure 8:
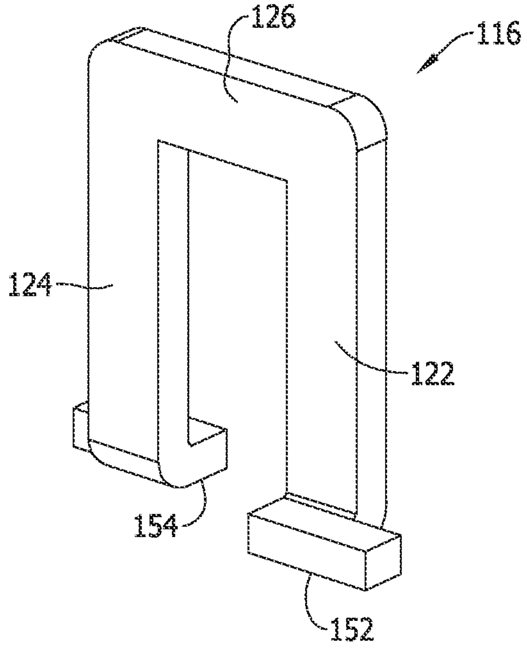
FIG. 8 is a perspective view of an inductor coil winding for the power inductor shown in FIG. 7.
Figure 9:
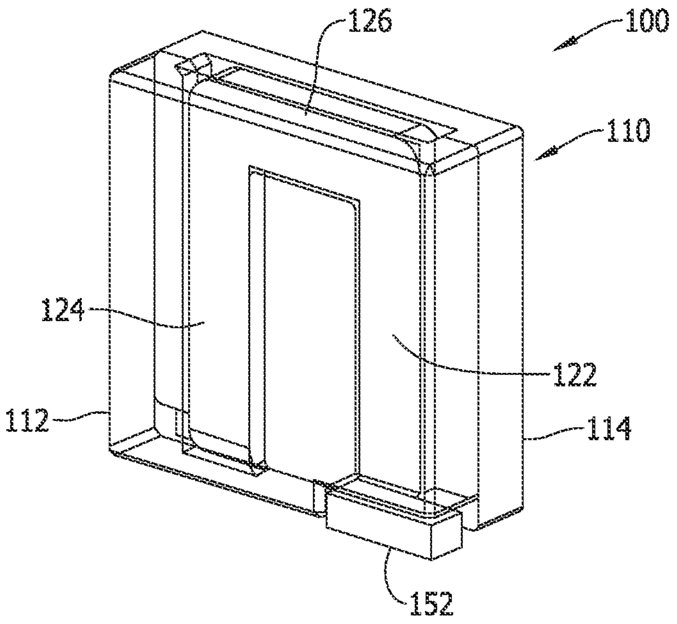
FIG. 9 is a partly transparent perspective view of the power inductor shown in FIG. 7.
Figure 10:
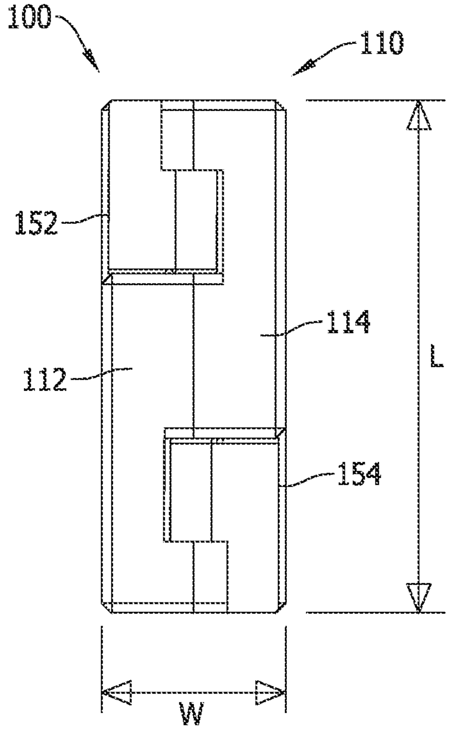
FIG. 10 is a bottom view of the power inductor shown in FIGS. 3 and 5 and illustrating the surface mount terminals of the inductor coil winding shown in FIG. 4.

FIGS. 7-10 illustrate various views of an improved electromagnetic component 150 according to a second exemplary embodiment of the invention, wherein FIG. 7 is a perspective view of the component 150, FIG. 8 is a perspective view of an inductor coil winding for the component 150, FIG. 9 is a partly transparent perspective view of the component 150, and FIG. 10 is a bottom view of component 150. The component 150 may be configured as a power inductor component in contemplated embodiments. The component 150 may be used in lieu of or in addition to the component 100 on the circuit board 102.

The component 150 is seen to be similar to the component 100 but includes surface mount terminals 152, 154 in the coil winding 116 which are enlarged to provide an increased surface area to make connections to the circuit board. In the example shown, the enlarged surface mount terminals 152, 154 are elongated in the length dimension in the assembled component 150. As such, and unlike the surface mount terminals 118, 120 in the component 100, the outer distal ends of the surface mount terminals 152, 154 extend beyond the respective peripheral side edges of the coplanar winding legs 122, 124, providing further elongation in the surface mount terminals 152, 154 on the sides and bottom of the component 150 adjacent the circuit board in use. In other words, in the length dimension L of the assembled component 150, the dimensions of the surface mount terminals exceed the corresponding dimension of the winding legs.

In FIG. 10 the enlarged surface mount terminals 152, 154 in the component 150 extend to the lateral and longitudinal side edges of the magnetic core pieces 112, 114 on the bottom of the magnetic core, while the surface mount terminals 118, 120 in the component 100 are spaced from the lateral edges of the magnetic core pieces 112, 114 as shown in FIG. 6. The increased contact surface area afforded by the enlarged surface mount terminals 152, 154 lowers contact resistance and improves the efficiency of the component 150 in use. Except for the enhancements in the surface mount terminals 152, 154, the benefits of the components 100 and 150 are otherwise similar.

Figure 11:
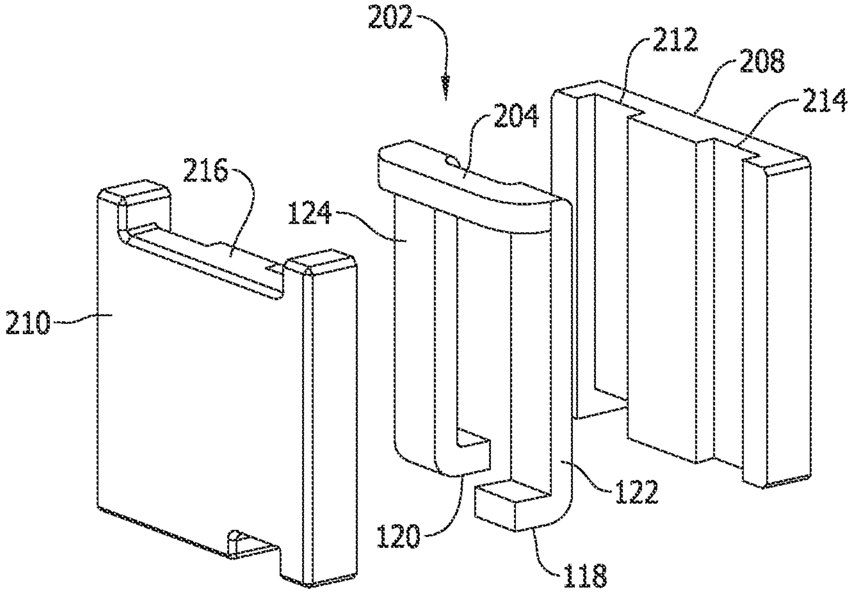
FIG. 11 is an exploded view of an improved high current power inductor including surface mount terminations for a circuit board application according to a third exemplary embodiment of the invention.
Figure 12:
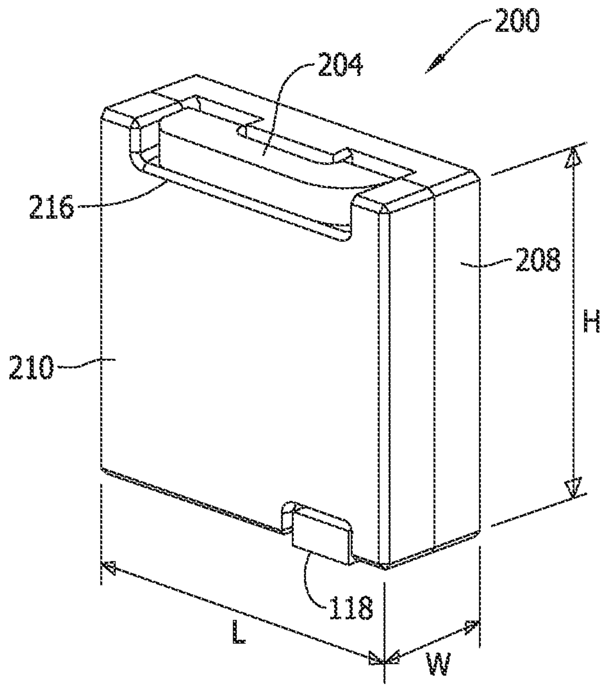
FIG. 12 is a perspective assembly view of the power inductor shown in FIG. 11.

FIGS. 11 and 12 illustrate various views of an improved electromagnetic component 200 according to a third exemplary embodiment of the invention, wherein FIG. 11 is an exploded view of the component 200 and FIG. 12 is a perspective assembly view of the component 200. The component 200 may be configured as a power inductor component in contemplated embodiments. The component 200 may be used in lieu of or in addition to the component 100 or 150 on the circuit board 102.

The component 200 includes a coil winding 202 having the surface mount terminals 118, 120 extending perpendicularly to coplanar winding legs 122, 124 as described above, but with the top winding section 204 bent to extend perpendicular to the plane of the winding legs 122, 124. The coil winding 202 accordingly requires three bends to form the coil (one to shape each surface mount terminal and one to bend the top section of the U-shaped section out of plane to realize the top winding section 204) instead of two bends in the coil winding 116, but with the advantage that the bent top winding section 204 reduces the height H of the component 200 and lowers the component profile while providing similar performance capability than the component 100. The bent top winding section 204 also provides an ability to adjust the direct current resistance in the coil when desired.

Unlike embodiments above wherein the magnetic core pieces are substantially identically fabricated to have the same shape, the component 200 includes magnetic core pieces 208 and 210 that are differently shaped from one another. Each magnetic core piece 208 and 210 includes vertically extending slots to receive the winding legs 122, 124 but the magnetic core piece 210 includes an upper recess that receives the bent top winding section 204. The bent top winding section 204 overlies only of the magnetic core pieces in this embodiment and is off-centered on the top of the component whereas in the previous embodiments the top winding section 126 is generally centered in the top of the component. The magnetic core piece 210 is also slightly smaller than the magnetic core piece 208, leading to some material savings in the fabrication of the magnetic core pieces relative to the previously described embodiments. The component 200 otherwise has the minimal width W and the advantages thereof described previously.

Figure 13:
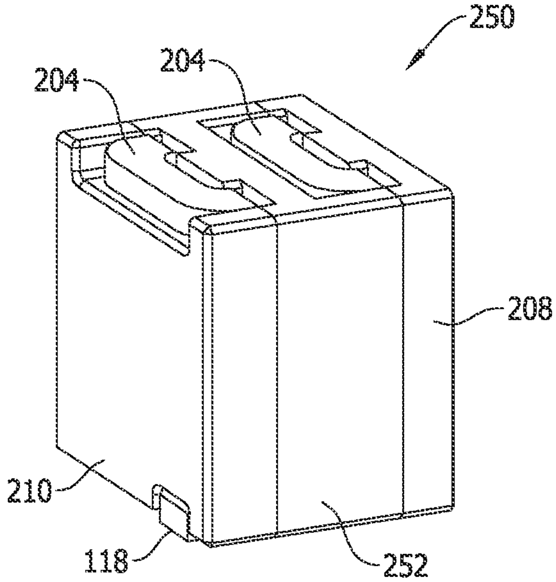
FIG. 13 is a perspective of an improved high current power inductor including surface mount terminations for a circuit board application according to a fourth exemplary embodiment of the invention.
Figure 14:
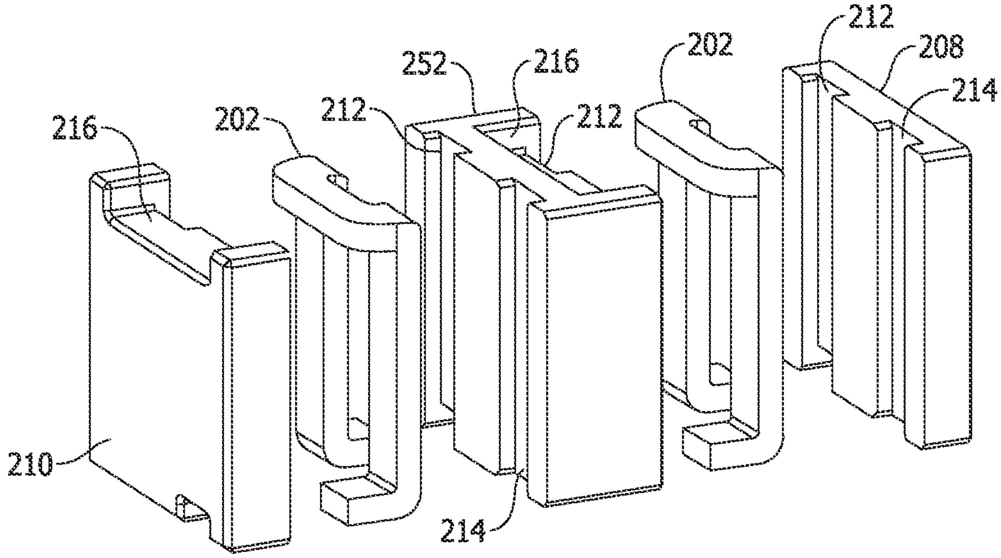
FIG. 14 is an exploded view of the power inductor shown in FIG. 13.

FIGS. 13 and 14 are views of an improved electromagnetic component 250 according to a fourth exemplary embodiment of the invention, wherein FIG. 13 is a perspective view of the component 250 and wherein FIG. 14 is an exploded view of the component 250. The component 250 may be configured as a power inductor component in contemplated embodiments. The component 250 may be used in lieu of or in addition to the component 100, 150 or 200 on the circuit board 102.

The component 250 is an expanded version of the component 200 described above to include a second coil winding 202 and a third magnetic core piece 252 extending between the magnetic core pieces 208, 210. The magnetic core piece 252 includes two sets of vertical slots 212, 214 on each opposing side thereof to respectively partly receive the coplanar winding legs 122, 124 of each of the two coil windings 116 and an upper recess 216 on one of the opposing sides. The first coil winding 202 is received between the magnetic core piece 210 and the magnetic core piece 252, and the second coil winding 202 is received between the magnetic core piece 252 and the core piece 208. The top winding sections 204 of the two coil windings 202 are separated from one another in a spaced relation by the core piece 252, with one of the coil windings 202 lying only on the core piece 210 while the other of the coil windings 202 lies only on the core piece 252.

The component 250 having the two coil windings 202 may be utilized in a two phase power application. Additional core pieces 252 and coil windings 202 may be added to scale the component to include any number n of coil windings integrated on a common core structure using the modular component core pieces and coil windings described. Polyphase power systems may therefore be accommodated with space efficiencies on the circuit board 102. The minimal width W and the advantages of the components described earlier are still realized in the component 500, albeit having more components in the assembly.

Figure 15:
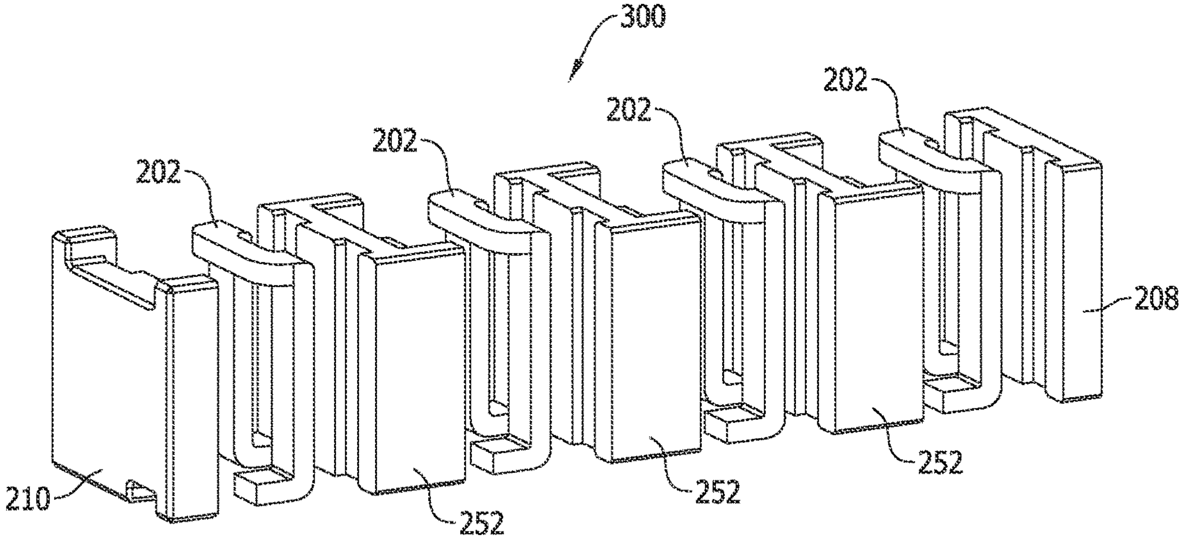
FIG. 15 is an exploded view of an improved high current power inductor including surface mount terminations for a circuit board application according to a fifth exemplary embodiment of the invention.

FIG. 15 is a perspective view of an improved electromagnetic component 300 according to a fifth exemplary embodiment of the invention. The component 300 may be configured as a power inductor component in contemplated embodiments. The component 300 may be used in lieu of or in addition to the component 100, 150, 200 or 250 on the circuit board 102.

The component 300 is an expanded version of the improved electromagnetic component 250 including additional core pieces 252 and coil windings 202 to provide four coil windings 202 integrated on a common core structure including three core pieces 252 and the core pieces 208, 210. In further embodiments, more than four coil windings 202 can be provided with additional core pieces 252. The minimal width W and the advantages of the components described earlier are still realized in the component 300, albeit having more components in the assembly.

Figure 16:
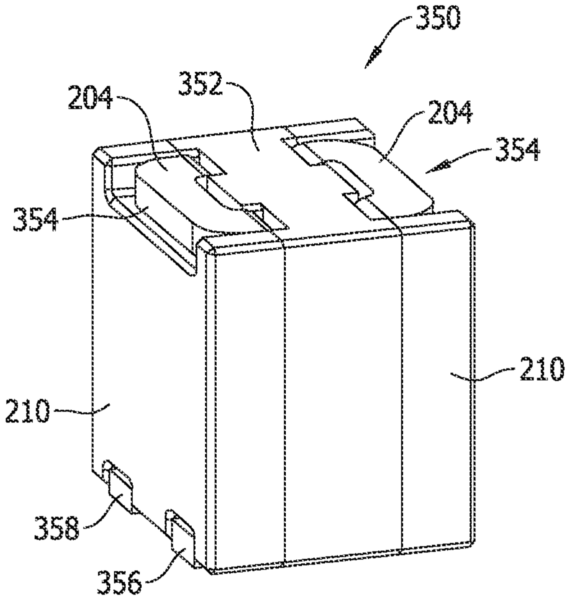
FIG. 16 is a perspective view of an improved high current power inductor including surface mount terminations for a circuit board application according to a sixth exemplary embodiment of the invention.
Figure 17:
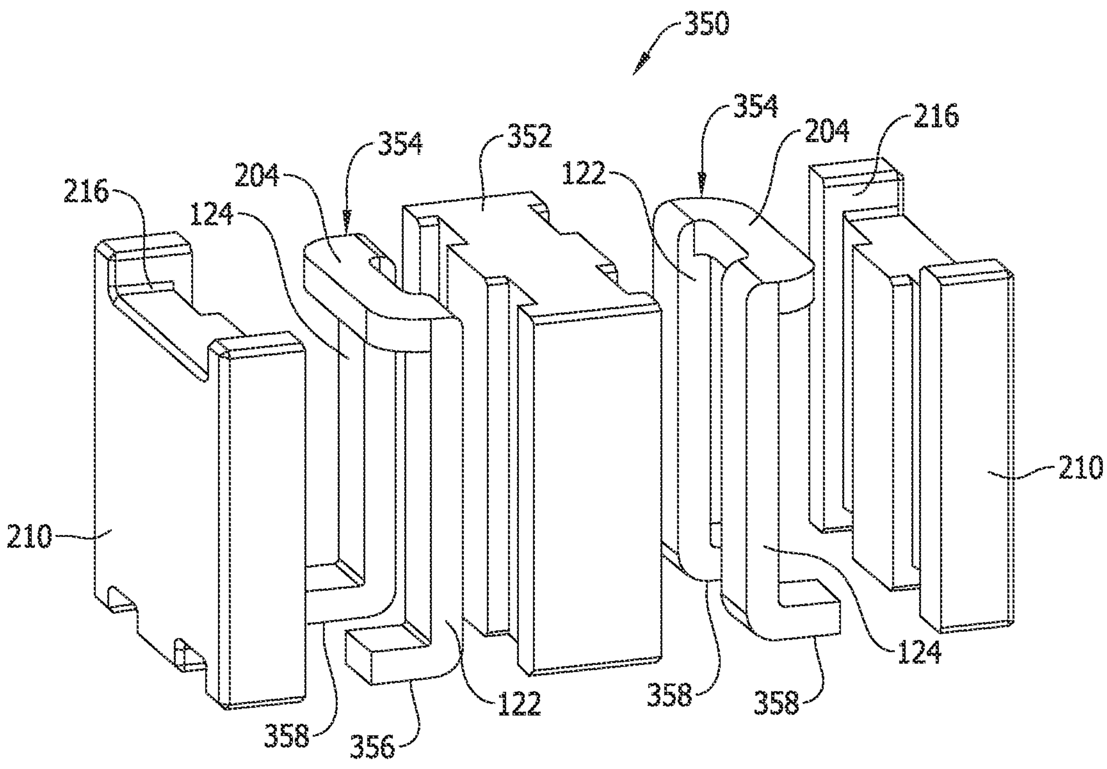
FIG. 17 is an exploded view of the power inductor shown in FIG. 16.

FIGS. 16 and 17 are views of an improved electromagnetic component 350 according to a sixth exemplary embodiment of the invention, wherein FIG. 16 is a perspective view of the component 350 and wherein FIG. 17 is an exploded view of the component 350. The component 350 may be configured as a power inductor component in contemplated embodiments. The component 350 may be used in lieu of or in addition to the previously described components on the circuit board 102.

The component 350 includes a third magnetic core piece 352 extending between magnetic core pieces 210 and a pair of coil windings 354. Unlike the coil winding 202, each coil winding 354 includes surface mount terminals 356, 358 that extend in the same direction from the ends of the winding legs 122, 124, and as such each of them extend in the same direction as the bent top winding section 204 in the example shown. The coil windings 354 are also oriented 180° from one another and therefore face in different directions, one facing the first core piece 210 and other facing the second core piece 210 with the core piece 252 separating the coil windings 202 from one another. The surface mount terminals 356, 358 of each coil winding 354 in this arrangement each extend on only one of the magnetic core pieces 210.

The core piece 352 includes vertical slots on each opposing side thereof to receive the winding legs 122, 124 of each coil winding 354. The bent top winding section 204 in each coil winding 354 is received in the upper recess 216 on each magnetic core piece 210. The magnetic core piece 352 therefore does not need an upper recess and is easier to fabricate than the core piece 252 in the component 200.

The minimal width W and the advantages of the components described earlier are still realized in the component 350, albeit having more components in the assembly. A similar component to the component 350 could also be realized using two coil windings 202 instead of the coil windings 354.

Figure 18:
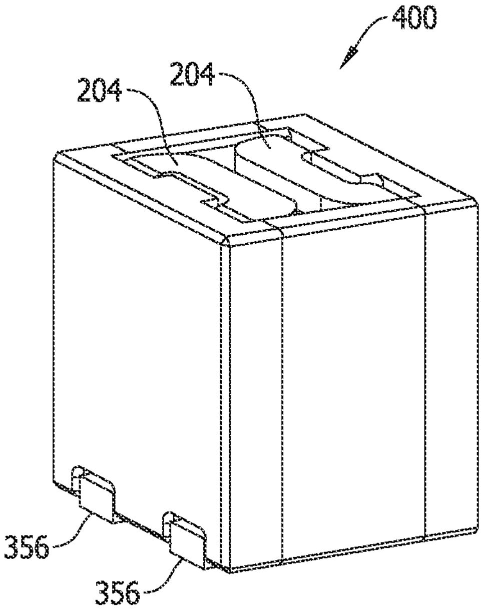
FIG. 18 is a perspective view of an improved high current power inductor including surface mount terminations for a circuit board application according to a seventh exemplary embodiment of the invention.
Figure 19:
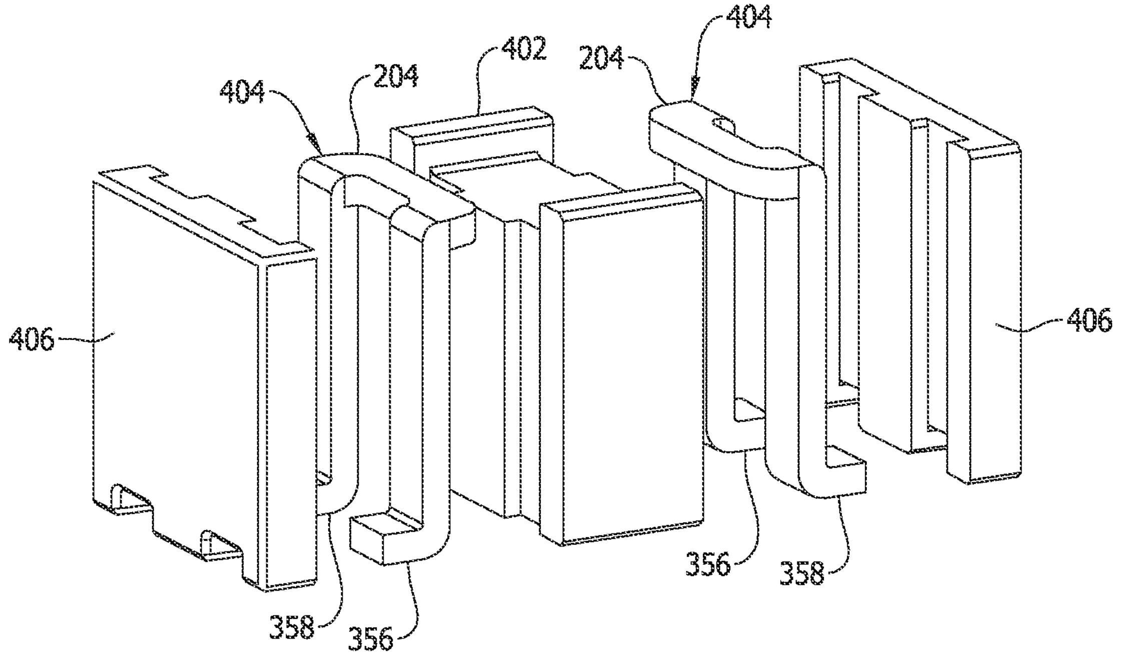
FIG. 19 is a perspective view of an exploded view of the power inductor shown in FIG. 18.

FIGS. 18 and 19 are views of an improved electromagnetic component 400 according to a seventh exemplary embodiment of the invention, wherein FIG. 18 is a perspective view of the component 400 and wherein FIG. 19 is an exploded view of the component 400. The component 400 may be configured as a power inductor component in contemplated embodiments. The component 350 may be used in lieu of or in addition to the previously described components on the circuit board 102.

The component 400 includes a magnetic core piece 402 separating coil windings 404 between magnetic piece 406. Like the coil winding 354 each coil winding 404 includes surface mount terminals 356, 358 that extend in the same direction from the ends of the winding legs 122, 124, but unlike the coil winding 354 each of the surface mount terminals 356, 358 extend in a different direction from the bent top winding section 204 in the example shown. The coil windings 404 are also oriented 180° from one another and therefore face in different directions. The respective surface mount terminals 356, 358 in each coil winding 404 faces the first or second magnetic core piece 406, and the bent top winding section 204 extends toward the core piece 402. The surface mount terminals 356, 358 of each winding coil 404 in this arrangement each extend on only one of the magnetic core pieces 406, while both of the top winding sections 204 of the coil windings 402 extend on the core piece 402.

The core piece 402 includes vertical slots on each opposing side thereof and an upper recess as shown to respectively receive the winding legs 122, 124 of each coil winding 404 and the top winding sections 204. The bent top winding section 204 in each coil winding 354 is received in the upper recess 216 on the magnetic core piece with the top winding sections 204 extending toward one another. The magnetic core pieces 406 include vertical slots to receive the winding legs of each coil winding 404 but do not include an upper recess and is therefore easier to fabricate than the core piece 252 in the component 200.

The minimal width W and the advantages of the components described earlier are still realized in the component 400, albeit having more components in the assembly. A similar component to the component 400 could also be realized using winding coils having surface mount terminals that extend in opposite directions like the coil winding 202.

Embodiments similar to those shown in FIGS. 13-19 are contemplated in which some of the magnetic core pieces do not include vertical slots, but instead one of the other core pieces provided fully receives the winding legs of the coil windings utilized. Further, combinations of the coil windings the core piece described could be mixed and matched to realize further embodiments of inductor components that are generally scalable to include a number n of inductors on an integrated core structure using a small number of modular core pieces and preformed coil windings.

When desired, in order to balance the magnetic path to help optimize and maximize the performance of the inductor including the bent top winding section 204, an asymmetrical path may be created in the magnetic core by varying the width (excluding the vertical slots) of the core pieces utilized to receive the windings. The overall width W of the component may still be practically minimized, while the effects of an unbalanced magnetic path attributable to the bent top winding section 204 are reduced.

The benefits and advantages of the invention are now believed to have been amply illustrated in relation to the exemplary embodiments disclosed.

An embodiment of an electromagnetic component assembly for a circuit board has been disclosed, wherein the component assembly includes a magnetic core assembled from a first magnetic core piece and a second magnetic core piece, wherein each of the first magnetic core piece and the second magnetic core piece each include a top side and a bottom side, wherein the top side is elevated from the circuit board and the bottom side is proximate the circuit board in use, and wherein the first magnetic core piece and the second magnetic core piece are arranged side-by-side. A first preformed conductive coil winding is received by at least one of the first magnetic core piece and the second magnetic core piece. The first preformed conductive coil winding includes a U-shaped winding section including a top winding section and a pair of winding legs extending from opposing ends of the top winding section, wherein the pair of winding legs extend coplanar to one another and are oriented perpendicular to the circuit board in use, the pair of winding legs further being located in between the first magnetic core piece and the second magnetic core piece. The top winding section is bent to extend perpendicularly to the plane of the pair of winding legs, and first and second surface mount terminals respectively extend perpendicular to the pair of winding legs opposite the top winding section.

Optionally, the top winding section extend over only one of the first magnetic core piece and the second magnetic core piece. The first surface mount terminal may extends only on the bottom side of the first magnetic core piece, while the second surface mount terminal may extend only on the bottom side of the second magnetic core piece. The first surface mount terminal and the second surface mount terminal may also extend on the same one of the first magnetic core piece and the second magnetic core piece. The first surface mount terminal and the second surface mount terminal may extend from the plane of the winding legs in the same direction as the top winding section, or may extend from the plane of the winding legs in an opposite direction to the top winding section.

Also optionally, at least one of the first and second magnetic piece may be formed with a pair of vertical slots to respectively receive the pair of winding legs. In some embodiments, both of the first and second magnetic piece are formed with a pair of vertical slots to respectively receive the pair of winding legs. At least one of the first and second magnetic piece may be formed with an upper recess to receive the top winding section. In some embodiments, both of the first and second magnetic pieces may be formed with an upper recess to receive the top winding section.

Optionally, the magnetic core has a length dimension, a width dimension, and a height dimension, wherein the length and height dimension are substantially greater than the width dimension. The first and second surface mount terminals may extend parallel to the width dimension. The plane of the pair of winding legs may be oriented to extend parallel to the length dimension of the magnetic core.

A a third magnetic core piece and a second preformed conductive coil winding fabricated substantially identically to the first preformed conductive coil winding may optionally be provided, wherein the third magnetic core piece separates the first and second preformed conductive coil windings from another in between the first and second magnetic core piece. The top winding sections of each of the first and second preformed conductive coil windings ma be received on the third magnetic core piece. The first and second preformed conductive coil windings may be reversed 180° from one another on opposing sides of the third magnetic core piece. The top winding sections of each of the first and second preformed conductive coil windings may also extend entirely on different ones of the first and third magnetic core pieces. The third magnetic core piece may include vertical slots to receive the winding legs of at least one of the first and second preformed conductive coil windings, and may also include an upper recess to receive the top winding section of one of the first and second preformed conductive coil windings. The assembly is scalable to include n numbers of additional preformed coils and n numbers of additional core pieces.

The component may be a power inductor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electromagnetic component assembly for a circuit board, the component assembly comprising:
- a magnetic core assembled from a first magnetic core piece and a second magnetic core piece, wherein each of the first magnetic core piece and the second magnetic core piece each include a top side and a bottom side, wherein the top side is elevated from the circuit board and the bottom side is proximate the circuit board in use, and wherein the first magnetic core piece and the second magnetic core piece are arranged side-by-side; and
- a first preformed conductive coil winding received by at least one of the first magnetic core piece and the second magnetic core piece;
- wherein the first preformed conductive coil winding includes:
  - a U-shaped winding section including a top winding section and a pair of winding legs extending from opposing ends of the top winding section, wherein:
    - the pair of winding legs extend coplanar to one another and are oriented perpendicular to the circuit board in use, the pair of winding legs further being located in between the first magnetic core piece and the second magnetic core piece;
    - the top winding section is bent to extend perpendicularly to a plane of the pair of winding legs, wherein the top winding section further includes:
      - a first bend in a direction towards the first magnetic core piece and extending parallel to the circuit board;
      - a second bend perpendicular to the first bend and extending parallel to the circuit board;
      - a third bend, in a direction away from the first magnetic core piece and perpendicular to the second bend;
    - the bent top winding section is configured to fit into a recessed portion of the first magnetic core piece; and first and second surface mount terminals respectively extending perpendicular to the pair of winding legs opposite the top winding section.

2. The electromagnetic component assembly of claim 1, wherein the top winding section extends over only one of the first magnetic core piece and the second magnetic core piece.

3. The electromagnetic component assembly of claim 1, wherein the first surface mount terminal extends only on the bottom side of the first magnetic core piece, and wherein the second surface mount terminal extends only on the bottom side of the second magnetic core piece.

4. The electromagnetic component assembly of claim 1, wherein the first surface mount terminal and the second surface mount terminal extend on the same one of the first magnetic core piece and the second magnetic core piece.

5. The electromagnetic component assembly of claim 1, wherein the first surface mount terminal and the second surface mount terminal extend from the plane of the winding legs in the same direction as the top winding section.

6. The electromagnetic component assembly of claim 1, wherein the first surface mount terminal and the second surface mount terminal perpendicularly from the plane of the winding legs, wherein the first surface mount terminal extends in an opposite direction to the second surface mount terminal.

7. The electromagnetic component assembly of claim 1, wherein at least one of the first and second magnetic piece is formed with a pair of vertical slots to respectively receive the pair of winding legs.

8. The electromagnetic component assembly of claim 7, wherein both of the first and second magnetic piece are formed with a pair of vertical slots to respectively receive the pair of winding legs.

9. The electromagnetic component assembly of claim 8, wherein the second magnetic piece is formed with an upper recess.

10. The electromagnetic component assembly of claim 1, wherein the magnetic core has a length dimension, a width dimension, and a height dimension, wherein the length and height dimension are substantially greater than the width dimension.

11. The electromagnetic component assembly of claim 10, wherein the first and second surface mount terminals extend parallel to the width dimension.

12. The electromagnetic component assembly of claim 10, wherein the plane of the pair of winding legs is oriented to extend parallel to the length dimension of the magnetic core.

13. The electromagnetic component assembly of claim 1, further comprising a third magnetic core piece and a second preformed conductive coil winding fabricated substantially identically to the first preformed conductive coil winding, wherein the third magnetic core piece separates the first and second preformed conductive coil windings from another in between the first and second magnetic core piece.

14. The electromagnetic component assembly of claim 13, wherein the first and second preformed conductive coil windings are reversed 180° from one another on opposing sides of the third magnetic core piece.

15. The electromagnetic component assembly of claim 13, wherein the assembly is scalable to include numbers of additional preformed coils and numbers of additional core pieces.

16. The electromagnetic component assembly of claim 1, wherein the electromagnetic component assembly is a power inductor.

17. The electromagnetic component assembly of claim 1, wherein the first surface mount terminal and the second surface mount terminal extend perpendicularly from the plane of the winding legs, wherein the first surface mount terminal extends in a same direction with the second surface mount terminal.

* * * * *